Patented Jan. 21, 1936

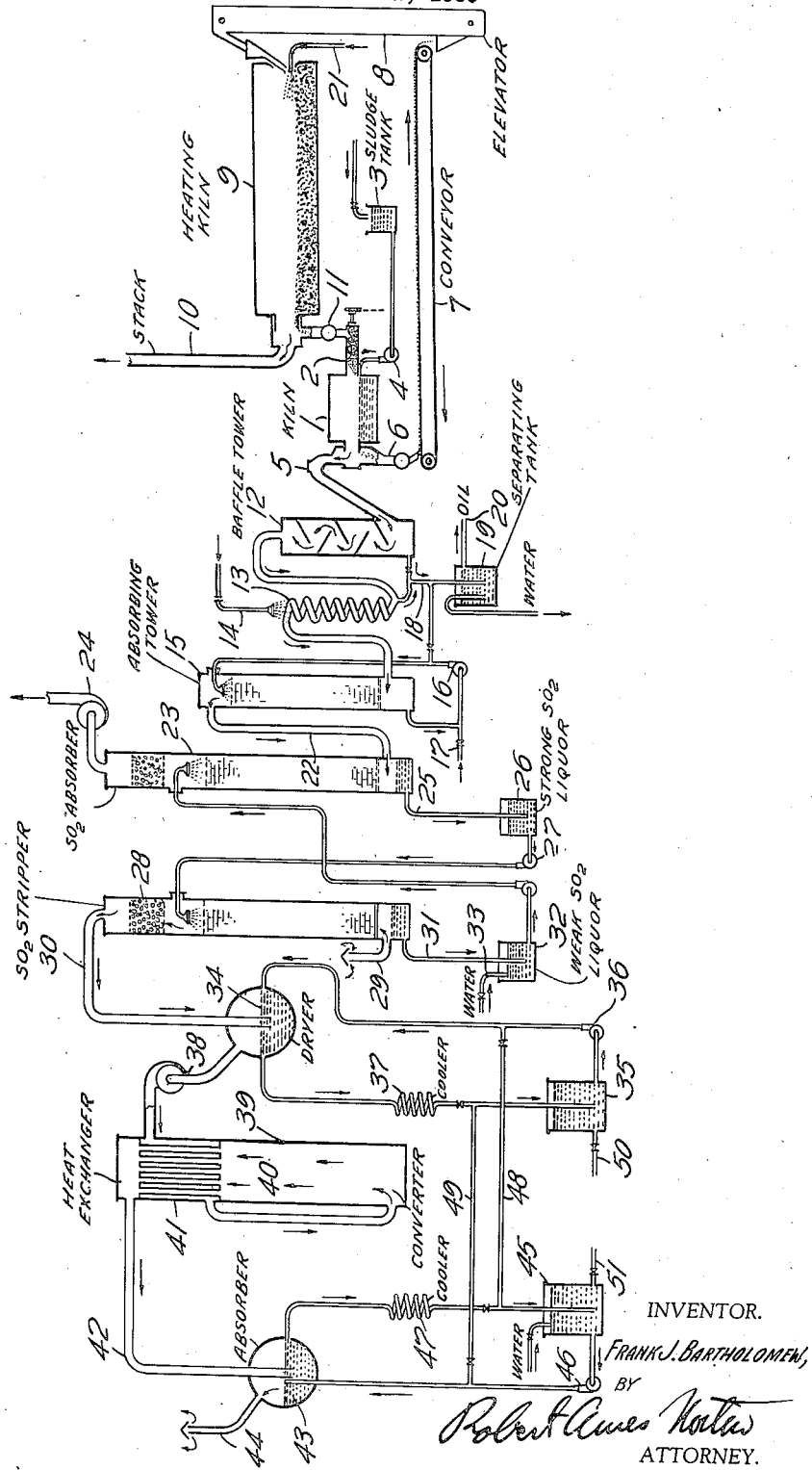

2,028,713

UNITED STATES PATENT OFFICE 2,028,713

PRODUCTION OF SO₂ FROM ACID SLUDGE

Frank J. Bartholomew, Westfield, N. J., assignor to Chemical Construction Corporation, New York, N. Y., a corporation of Delaware Application December 2, 1933, Serial No. 700,757

REISSUED
FEB 20 1940

15 Claims. (Cl. 23—177)

This invention relates to the production of SO₂ from acid sludge and more particularly from the acid sludge obtained in the sulphuric acid purification of petroleum hydrocarbons.

In the past acid sludge obtained in oil refineries has presented a serious problem. Many attempts were made to decompose the sludge thermally with the production of a gas containing SO₂. The attempts did not prove commercial successes until in 1931 the Hechenbleikner process, described and claimed in the co-pending application of I. Hechenbleikner, Serial No. 568,050, filed October 10, 1931, now Patent number 1,953,225, was developed using an internally heated rotary kiln. This process achieved immediate commercial success producing an SO₂ gas free from H₂S and SO₃ and leaving a residue in the form of a coke-like fuel which was continuously removed from the kiln.

The main use for the SO₂ gases from the decomposition of acid sludge is to reoxidize them to SO₃ in order to produce sulphuric acid for the oil refinery. When used in the contact process or even in the chamber process the presence of hydrocarbons in any considerable amount is very injurious. Unfortunately the gas obtained from the Hechenbleikner kiln, besides water and condensable hydrocarbons, contains a considerable proportion of uncondensable hydrocarbons and also some of the condensable hydrocarbons tend to form an oil mist which cannot be completely removed in the ordinary condensers. It became necessary to remove hydrocarbons in the Hechenbleikner process and this was effected practically by burning them out as described for example in the application of Hechenbleikner and Mast, Serial No. 693,136, filed October 11, 1933. This method while satisfactorily removing the hydrocarbons which would have otherwise been transformed into water in the contact plant with concomitant formation of the acid mist, diluted the gases very materially. In sludges which are low in oil the amount of hydrocarbons was not sufficiently great so that excessive dilution resulted from burning them out. On sludges of this type, therefore, the straight Hechenbleikner process operates with excellent commercial efficiency. When, however, high oil sludges are to be treated it became necessary to remove a part of the oil which was achieved by distilling off the more volatile hydrocarbons at low temperature, which left a sludge having the characteristics of low oil sludges and which could be satisfactorily handled in a straight Hechenbleikner process. This modification of the Hechenbleikner process is described and claimed in my co-pending application Serial No. 679,023, filed July 5, 1933.

I have found that the difficulties involved in the decomposition of high oil sludges are completely obviated when, instead of using combustion gases as a heating medium, finely divided heated solids, such as hot sand, are employed. When hot sand is contacted with an acid sludge in a closed vessel such as a kiln, decomposition takes place extremely rapidly permitting great capacity from small apparatus and producing a very strong gas which may contain from 75 to 90% SO₂. The coke and sand which are discharged from the kiln in the present process form a more or less homogeneous mass and when burned in a suitable furnace or kiln the sand is heated by the combustion of the coke and is reused to decompose further amounts of sludge. The gas which is evolved, when cooled to condense out water and condensable hydrocarbons, has so low a hydrocarbon content as compared to SO₂ that the hydrocarbons can be burned out without any dilution problem and in some cases it is not necessary to remove them at all as where the hydrogen content is sufficiently low so that after mixing enough air to bring the SO₂ to the proper concentration for use in the contact process, the hydrogen content is not more than 3 milligrams per cubic foot. While this complete elimination of hydrocarbon removal is only possible with certain sludges, in every case the removal of hydrocarbons is simplified and the bad results from excessive dilution are not experienced.

The very strong SO₂ gas likewise lends itself to other utilization. Thus, for example, a very efficient purification can be effected by absorbing the SO₂ in water or dilute SO₂ liquor and then stripping the SO₂ off from the liquor either by heat or by bubbling air through it. Another outlet lies in the production of liquid SO₂ which can be made effectively from the high strength gas by compression and cooling. The present invention also lends itself to the production of sulphur from the SO₂ gases, for example, by the process described and claimed in the co-pending application of C. B. Clark, Serial No. 675,973, filed June 15, 1933. The greater the strength of SO₂ gas the more efficient is the process and this is particularly true in the sulphur recovery apparatus which cannot function effectively unless the concentration is kept reasonably high.

The present process is very economical because the coke in many cases has a very low sale value, if it has any at all, by reason of the fact that most refineries are not situated near a market for this type of fuel. The present invention utilizes this coke most effectively in running the process as there are more than enough heat units in the coke produced to reheat the sand. A further advantage lies in the fact that the sand, by reason of its very large surface, reacts with the acid sludge at an extraordinarily high rate of speed so that relatively small kilns can be used, which greatly reduces the apparatus cost for a given installation. Similarly the highly concentrated $SO_2$ gas requires much smaller purification equipment than is the case in a straight Hechenbleikner process where large volumes of diluting gases must be handled.

The amount of sand required, of course, depends to some extent on the sludge and on the temperature to which the sand is heated. I have found that very satisfactory results are obtained when the weight of sand is from three to four times that of the sludge and the temperature of the sand entering the kiln may advantageously be in the neighborhood of 1500° F., although the invention is in no sense limited to any such temperatures or proportions. Where the amount of coke is greater than that needed to heat the sand it may be burned with a sufficient excess of air to keep the temperature of the sand down to the desired figure. In general the temperature conditions will vary with different sludges, but it is an advantage of the present invention that it can be used with practically any sludge and requires virtually no modification of apparatus for different sludges. This is of great importance where the plant may have to handle sludges of different compositions and consistencies.

The invention will be described in greater detail in conjunction with the drawing which shows in diagrammatic elevation, partly in section, a typical installation embodying the present invention. It should be understood, of course, that the particular apparatus shown in no sense limits the invention, but is merely a representative example of the type of equipment in which the present invention may be practiced.

In the drawing the sludge decomposition kiln is shown at 1, it being noted that the kiln is very much smaller than a kiln of comparable capacity in a straight Hechenbleikner process. In fact the kiln is approximately one-quarter as long as is needed in the standard Hechenbleikner process. Hot sand at about 1500° F. is fed into the kiln by means of the screw 2 and at the same time sludge is pumped from the tank 3 by means of the pump 4 into the kiln where it mixes with hot sand as the kiln revolves. If desired, the sludge inlet pipe may be water cooled to prevent plugging because of coke formation in the pipe. The proportion by weight of sand to sludge may vary with different sludges. I find that very satisfactory results are obtained when the proportion is from 3 of sand to 1 of sludge to 4 of sand to 1 of sludge, but other proportions may be used. The decomposition of the sludge takes place very rapidly and a fine mixture of sand and coke is produced which is discharged at about 400° F. through the coke discharge 6. The gases evolved pass out through gas outlet 5. The sand and coke mixture falls on to a conveyor 7 on which it is transported to elevator 8 which raises it and discharges it into heating kiln 9 where the coke is ignited by the pilot flame 21 and burns.

The combustion gases pass up the stack 10. The combustion of the coke intimately mixed with the sand heats the latter to red heat and the sand is then discharged through the valve 11 into the screw feed where it flows into the kiln. The screw does not extend to the opening into the kiln so that sand piles up and acts as a gas seal. The hot gases passing out through the stack 10 may, of course, be utilized in any suitable manner such as in a waste heat boiler (not shown).

The gases evolved from the decomposition of the sludge pass through a baffled air condenser 12, thence through a condenser coil 13, cooled by a spray of water from the spray 14, and finally through a scrubbing tower 15 in which a constant circulation of water is effected by the pump 16. Fresh water is introduced into the system through the valved pipe 17. In the condensers and scrubbing tower hydrocarbons are very effectively condensed since the gases are undiluted by combustion gases and accordingly there is little or no oil mist formation. The water, which of course is saturated with $SO_2$, and the condensed oils flow out from the bottom of the two condensers through the pipe 18 into the separator 19 where oil is drawn off through the pipe 20 and the water containing dissolved $SO_2$ is continuously removed through a siphon pipe and, if desired, the $SO_2$ content may be recovered by stripping, preferably by means of heat. $SO_2$ solution and oil which is formed in the scrubber 15, are continuously drawn off from the circuit through a valved pipe which connects to the pipe 18.

The scrubbed gases leaving the tower 15 through the pipe 22, flow up through an absorbing tower 23 counter to a spray of cold water or dilute $SO_2$ solution. Practically all of the $SO_2$ is absorbed, the small residue of fixed gases being sucked off from the top of the tower by the blower 24. The $SO_2$ liquor thus formed flows out of the bottom of the tower through the pipe 25 into an $SO_2$ liquor tank 26. From the tank 26 the $SO_2$ liquor is pumped by the pump 27 into the top of a stripping tower 28 where it flows down over packing in countercurrent to a stream of air introduced into the bottom of the tower through the air inlet 29. This air strips most of the $SO_2$ out of the liquor and passes out at the top of the tower through the pipe 30. The stripped liquor flows out of the bottom of the tower through the pipe 31 into the weak liquor tank 32, where, if desired, make-up water may be introduced through the valved pipe 33. Make-up water is required as the amount of water vapor carried off by the blower 24 and by the stream of air in the stripping tower, is greater than the amount of moisture in the gases leaving the scrubber 15.

The $SO_2$ gas which is mixed with the proper amount of air for conversion into $SO_3$ by the contact process, leaves the tower 28 in a highly purified form but containing, of course, a considerable amount of moisture. This moisture is removed in the dryer 34 where the gas bubbles through a strong sulfuric acid which may be for instance, of 93% strength. The acid is circulated through the dryer from the acid tank 35 by means of pump 36, a cooler 37 being provided to maintain the temperature at the desired point so as to ensure efficient drying. The dehydrated gases are then sucked by the blower 38 and forced through the converter 39 which consists of a catalyst containing portion 40 and a heat exchanger 41. The converted gases after leaving the heat exchanger through pipe 42 are then absorbed in an absorber 43 in the usual manner, the waste gases passing out through a stack 44. The circulation of acid, which may be of 98% or greater strength, is from the tank 45 through the pump 46, absorber 43, and back through the cooler 47. The absorption of $SO_3$ in the absorber 43 requires the addition of water to the system. This is normally effected by causing a portion of the weak acid from the dryer circuit to flow into the absorber circuit through the valved pipe 48. Similarly, a portion of the strong acid from the absorber circuit can be caused to flow back into the dryer circuit through the valved pipe 49. Valved draw-off pipes 50 and 51 serve to draw off acid from the tanks 35 and 45 respectively, depending on whether the system is to produce 93% acid or stronger acid. If oleum is to be produced, usually two absorbers are arranged in series.

It should be understood that the particular method of purifying $SO_2$ gases by means of an absorber and stripper does not limit the invention. It is a very effective method of obtaining $SO_2$ gas of high purity for the contact process, but any other method may be used which proves desirable under the particular conditions of a given installation. Thus, for example, if it is desired, the small amount of hydrocarbons remaining in the gas leaving the scrubber 15 may be burned out as described in Hechlenbleikner and Mast application above referred to. Of course, the strength of the $SO_2$ gas is so great that no material dilution troubles arise.

The converter, absorber and drying system is shown in purely conventional form, and it should be understood that the invention may be used with any suitable design of converter, dryer or absorption equipment.

The invention has been described in detail in conjunction with a utilization of the $SO_2$ gas involving purification of the $SO_2$ beyond condensation of water and condensable hydrocarbons. This is not the only method of practicing the invention. Thus, for example, where the plant is situated close to a sulphur burning or sulphide ore burning plant the $SO_2$ gases from the two plants may be mixed which will normally result in a sufficient dilution of the hydrocarbon content so that the hydrogen present is less than three milligrams per cubic foot, and the mixed gases may be oxidized in a contact sulphuric acid process without further purification. This combined process is not claimed per se in the present application as it forms the subject matter of the co-pending application of C. B. Clark, Serial No. 675,973, filed June 15, 1933.

The invention has been described in great detail in conjunction with the treatment of acid sludge from the sulphuric acid purification of petroleum hydrocarbons. It is, of course, equally applicable to the decomposition of any sulphuric acid sludge from the purification of any carbonaceous material, such as, for example, coal tar fractions and the like.

The particular heating method employed, i. e., by burning coke and sand together, is generally applicable to the heat treatment of materials which leave a coke residue even though these materials may not give off $SO_2$. Thus, for example, the process may be used for the distillation of petroleum fractions and has the advantage that the coking problem, so serious in many petroleum stills, is not only not a problem but actually furnishes a very cheap fuel for heating the sand used as the heat transfer medium. In general, such a process is more applicable to straight distillation than to cracking processes because the heating is so sudden as to approximate a flash distillation and normally is not applicable for cracking reactions which require application of heat for a considerable period of time. In this broader aspect the heating means of the present invention is, therefore, applicable to any material which forms a coke residue on heat treatment.

When the coke and sand is passed through the heating kiln too rapidly for all the coke to burn, a mixture of hot coke and sand is discharged into the sludge kiln and operates as effectively as if pure hot sand were used. Where the amount of coke produced is considerably in excess of that required to heat the sand, this method gradually eliminates the sand from the cycle, although sand is usually necessary to start with.

What I claim is:—

1. A method of heating fluid materials which are too viscous to permit a flash decomposition by contact with extensive heating surfaces which are decomposed by heat treatment into a volatile portion and a carbonaceous residue, which comprises thoroughly mixing the fluid material with heated finely divided solids, the amount of solids being sufficient to transfer the required amount of heat to decompose the fluid material, removing volatile products from the zone of heating, removing the carbonaceous residue intimately mixed with the heating medium and reheating the heating medium by burning the carbonaceous residue in intimate contact therewith and reusing at least a major portion of the reheated material.

2. A method according to claim 1 in which the heating medium is hot sand.

3. A method of decomposing acid sludge from the sulfuric acid purification of hydro-carbonaceous material to yield a gas containing $SO_2$ substantially free from $H_2S$, which comprises thoroughly mixing the sludge with a stream of highly heated finely divided solid particles, the amount and temperature of the solid particles being sufficient to decompose the sludge and to form a coke-like solid residue in intimate admixture with the finely divided heated particles, continuously removing the $SO_2$ gas produced from the zone of reaction, removing the carbonaceous residue from the zone of reaction and burning the carbonaceous residue in order to reheat the solid particles contained therein and reusing at least a major portion of the reheated material.

4. A method according to claim 3 in which the heating medium is hot sand.

5. A method of decomposing acid sludge from the sulfuric acid purification of petroleum hydrocarbons, which comprises thoroughly mixing the sludge with a stream of highly heated finely divided solid particles, the temperature and amount of the particles being sufficient to decompose the sludge to a carbonaceous residue without formation of $H_2S$, continuously removing the $SO_2$ gas given off from the zone of reaction, removing the carbonaceous residue formed in intimate admixture with the heated particles and burning the residue to reheat the heating particles and reusing at least a major portion of the reheated material.

6. A method of decomposing acid sludge from the sulfuric acid purification of petroleum hydrocarbons, which comprises thoroughly mixing the sludge with a stream of highly heated sand, the temperature and amount of the sand being sufficient to decompose the sludge to a carbonaceous residue without formation of $H_2S$, continuously removing the $SO_2$ gas given off from the zone of reaction, removing the carbonaceous residue formed in intimate admixture with the heated sand and burning the residue to reheat the heating sand and reusing at least a major portion of the reheated material.

7. A method according to claim 5 in which the $SO_2$ gases are cooled to condense water and condensable hydrocarbons, uncondensable hydrocarbons are removed from the gas, the composition of the gas is adjusted to that suitable for oxidation of the $SO_2$ in the contact sulfuric acid process and the $SO_2$ is oxidized in contact with a contact sulfuric acid catalyst.

8. A method according to claim 5 in which the $SO_2$ gas is cooled to condense out water and condensable hydrocarbons, the gas is passed in contact with cold water having a sufficiently low concentration of dissolved $SO_2$ to substantially absorb the $SO_2$ of the gas and the $SO_2$ is removed from the liquor thus produced.

9. A method according to claim 5 in which the $SO_2$ gas is cooled to remove water and condensable hydrocarbons, the gas is then passed in contact with cold water having a sufficiently small content of dissolved $SO_2$ so that substantially all of the $SO_2$ of the gas is absorbed, the $SO_2$ is stripped from the liquor thus produced by a stream of air to form an $SO_2$ gas having sufficient concentration for use in the contact sulfuric acid process and the gas is passed thus formed at reaction temperature over a contact sulfuric acid catalyst.

10. A method according to claim 5 in which the $SO_2$ gas is cooled to remove water and condensable hydrocarbons and is then contacted with cold water having a sufficiently small dissolved $SO_2$ content so that the $SO_2$ of the gas is substantially absorbed, the liquor thus formed is stripped by passing air therethrough to form an $SO_2$ gas of suitable concentration for the contact sulfuric acid process, at least a portion of the stripped liquor is used for absorbing further amounts of $SO_2$ in the process and the $SO_2$ gas obtained by the stripping operation is passed at reaction temperature over a contact sulfuric acid catalyst.

11. A method according to claim 6 in which the $SO_2$ gases are cooled to condense water and condensable hydrocarbons, uncondensable hydrocarbons is removed from the gas, the composition of the gas is adjusted to that suitable for oxidation of the $SO_2$ in the contact sulfuric acid process and the $SO_2$ is oxidized in contact with a contact sulfuric acid catalyst.

12. A method according to claim 6 in which the $SO_2$ gas is cooled to condense out water and condensable hydrocarbons, the gas is passed in contact with cold water having a sufficiently low concentration of dissolved $SO_2$ to substantially absorb the $SO_2$ of the gas and the $SO_2$ is removed from the liquor thus produced.

13. A method according to claim 6 in which the $SO_2$ gas is cooled to remove water and condensable hydrocarbons, the gas is then passed in contact with cold water having a sufficiently small content of dissolved $SO_2$ so that substantially all of the $SO_2$ of the gas is absorbed, the $SO_2$ is stripped from the liquor thus produced by a stream of air to form an $SO_2$ gas having sufficient concentration for use in the contact sulfuric acid process and the gas thus formed is passed at reaction temperature over a contact sulfuric acid catalyst.

14. A method according to claim 6 in which the $SO_2$ gas is cooled to remove water and condensable hydrocarbons and is then contacted with cold water having a sufficiently small dissolved $SO_2$ content so that the $SO_2$ of the gas is substantially absorbed, the liquor thus formed is stripped by passing air therethrough to form an $SO_2$ gas of suitable concentration for the contact sulfuric acid process, at least a portion of the stripped liquor is used for absorbing further amounts of $SO_2$ in the process and the $SO_2$ gas obtained by the stripping operation is passed at reaction temperature over a contact sulfuric acid catalyst.

15. A method according to claim 5 in which the $SO_2$ gases are cooled to condense water and condensable hydrocarbons, the gases are mixed with sufficient air to produce a gas having a suitable $SO_2$ concentration for the contact sulfuric acid process, moisture is removed and the hydrocarbon content of the gas is adjusted so that the weight of hydrogen in the hydrocarbon is less than 3 mg. per cubic foot of gas and the gas is passed thus adjusted at reaction temperature over a contact sulfuric acid catalyst.

FRANK J. BARTHOLOMEW.